(12) United States Patent
Smith (10) Patent No.: US 11,332,004 B1
(45) Date of Patent: May 17, 2022

(54) VEHICLE DOOR ASSEMBLY

(71) Applicant: Lund Motion Products, Inc., Ann Arbor, MI (US)

(72) Inventor: Anthony Nicholas Smith, Costa Mesa, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 0 days.

(21) Appl. No.: 17/095,897

(22) Filed: Nov. 12, 2020

(51) Int. Cl.
 *B60K 15/05* (2006.01)

(52) U.S. Cl.
 CPC ........ *B60K 15/05* (2013.01); *B60K 2015/053* (2013.01); *B60K 2015/0507* (2013.01); *B60K 2015/0515* (2013.01); *B60K 2015/0546* (2013.01); *B60K 2015/0569* (2013.01); *B60K 2015/0576* (2013.01)

(58) Field of Classification Search
 CPC ............. B60K 15/05; B60K 2015/053; B60K 2015/0451; B60K 2015/0515; B60K 2015/0569; B60K 2015/0576; B60K 2015/0507; B60K 2015/0546; E05Y 2900/534; B60J 5/04
 USPC ....................... 296/97.22; 49/475.1, 386, 501
 See application file for complete search history.

(56) References Cited

U.S. PATENT DOCUMENTS

| | | | |
|---|---|---|---|
| 4,884,317 A * | 12/1989 | Liu ...................... | E05D 11/1064 16/385 |
| 6,352,295 B1 | 3/2002 | Leitner | |
| 7,258,386 B2 | 8/2007 | Leitner | |
| 8,215,333 B2 * | 7/2012 | Stokes .................... | B60K 15/04 137/312 |
| 9,925,865 B2 * | 3/2018 | Stack ...................... | B60K 15/04 |
| 10,384,534 B2 | 8/2019 | Guardianelli | |
| 2003/0071047 A1 * | 4/2003 | Harada ................. | E05F 1/1075 220/835 |
| 2011/0175389 A1 | 7/2011 | Franz | |
| 2019/0118644 A1 * | 4/2019 | Beck ...................... | B60K 15/05 |
| 2020/0086738 A1 * | 3/2020 | Marchlewski ......... | B60K 15/05 |

FOREIGN PATENT DOCUMENTS

FR 2731391 A1 * 9/1996 ............. E05B 83/34

OTHER PUBLICATIONS

Morando, "Control mechanism for automobile fuel tank access cover", Sep. 13, 1996. French Patent Office, vol. FR2731391A1. (Year: 1996).*

* cited by examiner

Primary Examiner — Dennis H Pedder
Assistant Examiner — Joyce Eileen Hill
(74) *Attorney, Agent, or Firm* — The Dobrusin Law Firm, P.C.

(57) ABSTRACT

A door assembly that includes a pocket having a biasing bore configured to accommodate a biasing member; a bezel attached to the pocket; and a door having a cam and at least one axle. The bezel has at least one axle slot. The at least one axle is received into the at least one axle slot and the biasing member is configured to apply an urging force onto the cam.

20 Claims, 6 Drawing Sheets

VEHICLE DOOR ASSEMBLY

FIELD

These teachings relate generally to a door assembly, and more particularly to a door assembly that may be used on a vehicle to conceal and/or provide access to a component of the vehicle.

BACKGROUND

Some vehicles have one or more door assemblies that can be opened to provide access to one or more components of the vehicle, such as a fuel fill pipe or a battery charging port, and then closed to conceal or cover the component. While many currently available door assemblies may be suitable for their intended purpose, it may be desirable to improve the current state of the art by providing an improved door assembly.

Examples of door assemblies are found in U.S. Pat. No. 6,352,295 and in U.S. Pat. No. 7,258,386 the entire disclosures of which are hereby incorporated by reference herein for all purposes.

SUMMARY

A door assembly that includes a pocket having a biasing bore configured to accommodate a biasing member; a bezel attached to the pocket; and a door having a cam and at least one axle. The bezel has at least one axle slot. The at least one axle is received into the at least one axle slot and the biasing member is configured to apply an urging force onto the cam.

A door assembly comprising: a pocket having at least one axle support; a bezel attached to the pocket, the bezel comprising at least one axle slot; and a door comprising a cam and at least one axle. The at least one axle is received into the at least one axle slot and the at least one axle support is enabled to support the at least one axle within the at least one axle slot.

A door assembly comprising: a pocket comprising a biasing bore for accommodating a biasing member; a bezel attached to the pocket, the bezel comprising at least one axle slot; and a door comprising a cam and at least one axle. The at least one axle is received into the at least one axle slot and the biasing member is enabled to apply an urging force onto the cam.

DETAILED DESCRIPTION

These teachings provide a door assembly. The door assembly may be attached to or may be part of a vehicle. The vehicle may be any vehicle. The vehicle may be an automobile, such as a pickup truck, a sport utility vehicle, and/or a passenger car. The vehicle may be an off-road vehicle, such as an all-terrain vehicle (ATV), an ultimate terrain vehicle (UTV), snowmobile, a four-wheeler, etc. The vehicle may be a boat or personal watercraft (PWC), or even an airplane. In some configurations, the door assembly may find use in non-vehicular applications, such as architectural structures like a home or office building.

The vehicle may have one or more panels onto which the door assembly according to these teachings is attached or mounted to. The panel may be any panel of the vehicle. The panel may be an interior panel—one that is located or found inside of the vehicle, such as in the passenger cabin or cockpit, in the engine or motor compartment, or in the trunk area. The panel may be an exterior panel, such as a fender, quarter panel, trunk, or hood decklid, etc.

The door assembly according to teach teachings may be attached to, incorporated into, integrated with, or part of the vehicle or panel thereof. The door assembly may be used to conceal or hide one or more components. The one or more components may be any component, like a vehicle fuel fill pipe, a vehicle battery charging port, a hitch receiver, an electrical outlet or power supply, a plug, a terminal, a button, and the like. The door assembly may be used to restrict or prevent physical and/or visual access to the component when the door assembly is in the closed position. In the closed position, the door assembly may restrict or prevent dirt, dust, fluids, and/or other debris from entering the inside of the door assembly or pocket and contacting, contaminating, and/or otherwise damaging or making the component or any feature inside of the door assembly or pocket dirty. In the closed position, the door assembly may restrict or prevent dirt, dust, fluids, and/or other debris from exiting the inside of the door assembly or pocket. The door assembly may be moved into the open position to provide visual and/or physical access to the inside of the panel, door assembly, pocket, component, etc. The door assembly may be manually actuated to move the door assembly from the closed to open position and from the open to closed position. The door assembly may be automatically actuated to move the door assembly from the closed to open position and from the open to closed position, for example, via a spring or biasing member, a piston/cylinder arrangement, or other suitable mechanism or means. The door assembly generally includes one or more doors, one or more pockets, and one or more bezels. It is understood, of course, that in some configurations, one or more of the doors, pocket, and/or bezel may be combined into a single component or split into one or more subcomponents.

The door assembly may include one or more doors. The one or more doors may function to block, restrict, or prevent access to the inside of the door assembly, the pocket, the component, or a combination thereof when the door assembly or door is in the closed position. The door may be moved or pivoted about an access to move the door assembly or door into an open position, where visual and/or physical access to the inside of the door assembly, the pocket, the component, or a combination there of is permitted. The door may be manually moved between the closed and open positions and/or the door may be automatically moved between the closed and open positions. Automatically means that the door can pivot or move between the closed and open positions by depressing a button, sending one or more electronic signals to the door assembly, being in close proximity to the door with a key fob or mobile application, actuating a piston/cylinder mechanical, actuating a spring or other bias mechanism, or a combination thereof.

The door may have a generally flat or planar profile. The door may have a curved or non-flat or non-planar profile. A profile of the door may match a profile of the panel into which the door assembly is installed to provide an integrated and sleek appearance. The door may have a generally circular shape. However, the door may have any other shape, such as a square, oval, triangle, etc. The door may be made of a suitable material such as plastic, metal, composite, or a combination thereof. The door may be made of an aluminum or steel. The door may be painted or have a texture.

The door or the door assembly may include one or more bezel couplings. A bezel coupling may be configured to coact with one or more features of the bezel or door assembly to connect together the door and the bezel. A bezel coupling may be configured to coact with one or more features of the bezel or door assembly to provide for the door to move or pivot between the closed and open positions and vice versa. The one or more features that the bezel coupling coacts with to perform one or more of these functions may be the door coupling. The bezel coupling may be attached to the door with one or more fasteners. The bezel coupling may be integrally formed with the door. The bezel coupling may be a secondary component that is molded or formed with the door (i.e., insert molded).

The bezel coupling may include one or more axles or axle portions. The bezel coupling may include one or more cams. In some configurations one or more features of the bezel coupling may be provided on the bezel. Some of the features of the door coupling may be provided on the door.

The door or the bezel coupling of the door may include one or more axles. The one or more axles may cooperate with one or more features or axle slots in the bezel to connect the door to the bezel. The one or more axles may cooperate with one or more features or axle slots in the bezel to allow the door to move or pivot between the closed and open positions. The axles may be portions or ends of a single, elongated axle. The axles may be individual, separate discrete pieces. The axles may be a shaft, a pin, a bearing, a bolt, a screw, a dowel, or a combination thereof. The axles may be made of plastic, metal, composite, ceramic, or a combination thereof.

The axles may be attached to the door or bezel coupling via one or more fasteners, like adhesives, screws, welds, or a combination thereof. The axles may be press fit or have an interference fit with the door or bezel coupling. The axles may be insert molded during a process of forming the door. The axles may be restricted or prevented from rotating or moving relative to the door. However, in some configurations, the axles may be configured to move or rotate relative to the door. The axles may have a smooth outer surface. The axles may have a textured or knurled portion. A textured or knurled portion may be desirable to assist with assembly of the axles with the door and/or retaining the axles after assembly. The axles may extend along a single, elongated axis that may be the pivot axis about which the door moves or pivots between the closed and open positions.

The door assembly may include one or more bezels. The bezel may function to provide a close out or trim ring for the door assembly. The bezel may close out one or more gaps defined between the pocket and the panel into which the door assembly is received. The bezel may function to provide structure for the door to attach or connect to the bezel or door assembly. The bezel may function to provide structure for the door to pivot or move between the closed and open positions.

The bezel may have a generally circular shape. However, the bezel may have any other shape, such as a square, oval, triangle, etc. The bezel may be a ring. The bezel may be a circular ring. The bezel may be like a picture frame, with a frame surrounding an open space.

The bezel may have an outer circumference or diameter that is approximately the same size as an outer surface or circumference of the pocket or flange of the pocket. The bezel may have an inner circumference or diameter that is approximately the same size and shape as an outer surface or circumference or diameter of the door. When the door is in the closed position, the door may at least partially fit within the opening of the bezel. In some configurations, when the door is in the close position, the door may rest on top of the bezel. The bezel may be made of a suitable material such as plastic, metal, composite, or a combination thereof. The bezel may be made of an aluminum or steel. The bezel may be an aluminum die cast. The bezel may be injection molded. The bezel may be made of two or more materials that may be attached or adhered to one another with one or more fasteners, clips, or adhesives. The bezel may be made of two or more materials formed in a multi-shot molding process. The bezel may be painted or have a texture or grain. The bezel may include one or more door couplings.

A door coupling may be configured to coact with one or more features of the door or door assembly to connect together the door and the bezel. A door coupling may be configured to coact with one or more features of the door or door assembly to provide for the door to move or pivot between the closed and open positions and vice versa. The door coupling may be attached to the bezel with one or more fasteners. The door coupling may be integrally formed with the bezel. The door coupling may be a secondary component that is molded or formed with the bezel (i.e., insert molded).

The door coupling may include one or more axle slots. The one or more axle slots may function to receive, secure, contain, and/or accommodate one or more features of the door, bezel coupling, axles, and the like. The one or more axle slots may function to receive, secure, contain, and/or accommodate one or more features of the door, bezel coupling, axles, or a combination thereof to connect the door to the bezel or door assembly. The one or more axle slots may function to receive, secure, contain, and/or accommodate one or more features of the door, bezel coupling, axles, or a combination thereof to provide for the door to move or pivot between the open and closed configurations.

The one or more axle slots may have a hook shape. The one or more axle slots may have a circular or half-circular shape into which the axles are received. The one or more axle slots may be configured to allow or provide for the axles to rotate therein during movement of the door between the closed and open positions. The one or more axle slots may be tapered or have one or more undercuts to at least partially retain and support the one or more axles therein and prevent the axles from falling out of the slots. The one or more axle slots may have an open end that is arranged to face the flange, the one or more axle supports, or both. In other configurations, the open ends may face other directions or may be angled relative to the axle slots, flange, or both. The axle slots may have a smooth finish for the axles to freely slide or rotate therein. The axle slots may have a sleeve or bushing to prevent wear to the door, door axles, axle slots, or a combination thereof during movement of the door between closed and open positions.

The bezel may include one or more pocket connection features. A pocket connection feature may function to connect the bezel to the pocket. A pocket connection feature may function to cooperate or coact with one or more bezel connection features on the pocket, the flange of the pocket, or both to attach or connect together the bezel and the pocket. The one or more pocket connection features may comprise one or more protuberances, prongs, clips, projections, snap features, openings, bores, slots, slits, apertures, screws, bolts, rivets, pins molded-in threads, any combination thereof. Additionally, or alternatively, the bezel may be connected to the pocket via one or more fasteners like welds or adhesives.

The door assembly may include one or more pockets. The pocket may have a cavity or inner portion that houses, accommodates, contains, or interacts with the component to be concealed by the door.

The pocket may have one or more biasing bores. The one or more biasing bores may be located anywhere on the pocket, such as on the flange, in the cavity, or both. The one or more biasing bores are configured to receive one or more biasing members. A biasing member may be a spring, grommet, or other bias member that is configured to exert a force onto the door or cam. The biasing member may be a resilient member. The biasing member may be an elastomeric member. The biasing member may be configured to contact the door and/or urge the door into the closed and/or open positions, during movement of the door between the closed and open positions. The biasing member may contact the door, cam, cam portions, or a combination thereof. In certain configurations, the biasing member may be part of the cam and/or camming portions and contact the pocket or flange during movement of the door between the closed and open positions. The pocket may be made of a suitable material such as plastic, metal, composite, or a combination thereof. The pocket may be made of an aluminum or steel. The pocket may be painted or have a texture or grain.

The biasing member may be in contact with the door or a portion of the door, like one or more of the camming surfaces or the cam. The biasing member may be connected to the door or a portion of the door via one or more pins or links. This means that there is a direct connection between the biasing member and the door. The links or pins may provide various degree of freedom movements for the door to move along a predetermined path between the closed and open positions. The biasing member may be connected to the biasing bore such that the biasing member is retained therein, regardless if there is a surface or force acting on the biasing member in the opposite direction of the bias of the spring. The biasing member may include a spring, like a conical or helical spring or may include other biasing materials like a grommet, V-spring, and the like.

The pocket may have one or more support members and/or axle supports. The support members may be door supports, axle supports, or both. The support members may be configured to support or urge or maintain the one or more axles in or within the axle slots and/or restrict or prevent the axles from falling out of the axle slots. The support members may be rigid. The support members may be flexible or resilient. The support members may be projections, protuberances, and/or standoffs that extend or project away from the pocket or cavity. The support members may be biasing members or springs. The support members may be one or more ribs, tabs, projections, or other added features that function to maintain the axles in the slots. In some instances, the support members or axle supports may be eliminated and the axles may be maintained in the axle slots via one or more undercuts or ribs added to the slots to maintain or support the axles therein. The one or more axle supports may also be one or more door supports. In other words, the one or more door supports may function to restrict or prevent a door from opening beyond a predetermined position and also support the one or more axles within the one or more axle slots. Similarly, the one or more axle supports may function to restrict or prevent a door from opening beyond a predetermined position and also support the one or more axles within the one or more axle slots. The one or more door supports and/or axle supports may have a flat or planar top that interacts with the door and/or axles. The one or more door supports and/or axle supports may have a curved or recessed top that interacts with the door and/or axles.

The pocket may include one or more door supports. The one or more door supports may restrict or prevent the door or door assembly from opening beyond a predetermined point. For example, when the door is moved into the open position, the door support may contact the door and restrict or prevent the door from being moved into a further open position or beyond the maximum predetermined opening point. For example, the door may be moved approximately 90 degrees from the closed position into the open position. Movement of the door beyond 90 degrees away from the bezel or flange of the pocket may be restricted or prevented due to the door support contacting the door. The one or more door supports may limit the door from opening beyond about 90 degrees, beyond about 110 degrees, beyond about 130 degrees, beyond about 145 degrees, beyond about 160 degrees, beyond about 180 degrees.

The pocket may include one or more door supports. The one or more door supports may be one or more flanges, projections, protuberances, or any features that may interfere with movement of the door beyond a predetermined position. The one or more door supports may be a biasing member or spring, a screw, a rib, or a combination thereof. The one or more door supports may be located on the door, the pocket, the bezel, or a combination thereof. The one or more door supports may contact the door, one or more camming features, the axles, or a combination thereof to restrict or prevent movement of the door beyond a predetermined position. The one or more door supports may be located on any portion of the bezel or pocket. The door supports may be arranged between one or more axle supports. The one or more axle supports may be arranged between the one or more door supports. The one or more door supports may have a height that is taller than the one or more axle supports, taken from a measurement beginning at the flange. Alternatively, the one or more axle supports may be taller than the one or more door supports. Alternatively, the one or more axle supports may be generally the same height as the one or more door supports.

The pocket may include one or more drains. The one or more drains may function to evacuate or provide egress for fluids and/or debris to be removed or evacuated from the pocket or door assembly. The one or more drains may be provided at any location of the pocket. The one or more drains may have a shroud on the back side of the pocket to assist in directing or evacuating the debris or fluids out of the cavity or pocket. The one or more shrouds may function to restrict or prevent fluid and/or debris from entering the cavity or pocket from a back side of the pocket or door assembly. The one or more shrouds may direct the fluid and/or debris in a generally vertical direction, horizontal direction, or an angled direction therebetween.

The door assembly may include one or more link assemblies. The one or more link assemblies may function to connect together the door and one or more other elements of the door assembly like the bezel, the pocket, or both. The link assembly may be provided or assist with allowing the door to move or pivot between the open and closed positions. The link assembly may restrict or prevent the door from opening beyond a predetermined open position.

The link assembly may include one or more links, one or more pins, one or more supports, or a combination thereof. The one or more links may include one or more openings. The one or more openings may be adapted to receive the one or more pins. In certain configurations, the one or more pins may be integrally formed with the link. In other configurations, the link and one or more pins may be discrete pieces. In certain configurations, the one or more links may be attached to the supports or the bevel connection and the cap and engage openings in the link. There may be one link directly connected to the bezel connection and the cap, or there may be more than one link extending between the cap and bezel connection. More than one link may provide for the door to open and close along a customized path. The one or more links may be generally straight (linear). The one or more links may be curved or have a non-linear profile. The curved or non-linear profile may provide for the door to open and close along a customized path. For example, the one or more links may have an L-shape, a U-shape, a J shape, etc. One or more bearings may be provided at the connections between the bezel connection, link, and/or supports. The one or more bearings may function to allow the door to open and close smoothly.

Figure 1A:
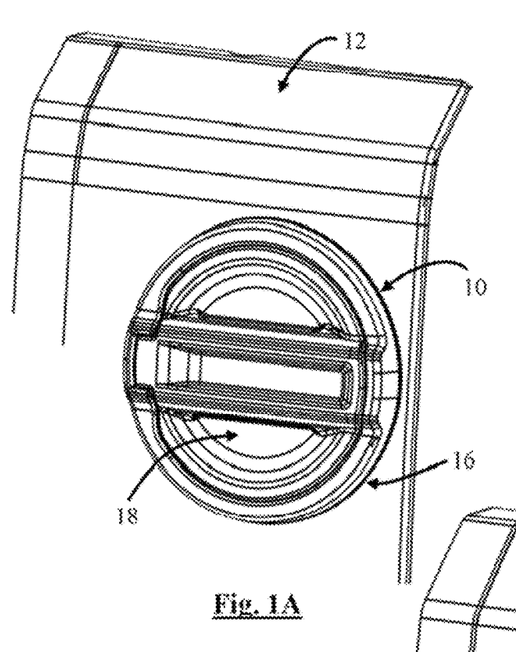
FIG. 1A is a perspective view of a door assembly in a closed position.
Figure 1B:
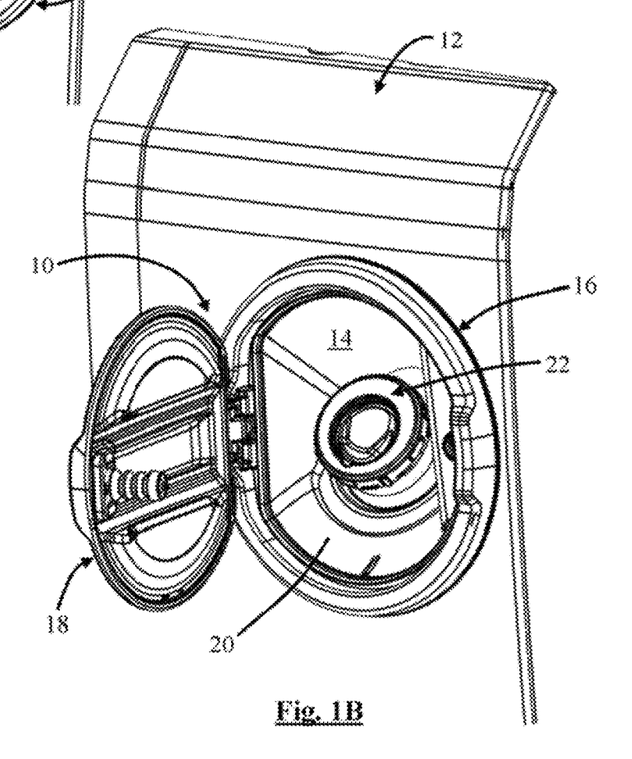
FIG. 1B is a perspective view of the door assembly in an open position.

FIGS. 1A and 1B illustrate a door assembly 10 installed in a panel 12 of a vehicle. The door assembly 10 generally includes a pocket 14, a bezel 16, and a door 18. In FIG. 1B, the door assembly 10 or door 18 is in an open position, where access to a cavity 20 of the pocket 14 is permitted. A component 22 inside of the pocket 14 or cavity 20 may be accessible when the door assembly 10 or door 18 is in the open position. In FIG. 1A, the door assembly 10 or door 18 is in a closed position, where the component 22 is concealed and/or access to the pocket 14, cavity 20, and/or the component 22 is restricted or obstructed.

Figures 2, 3A, 3B:
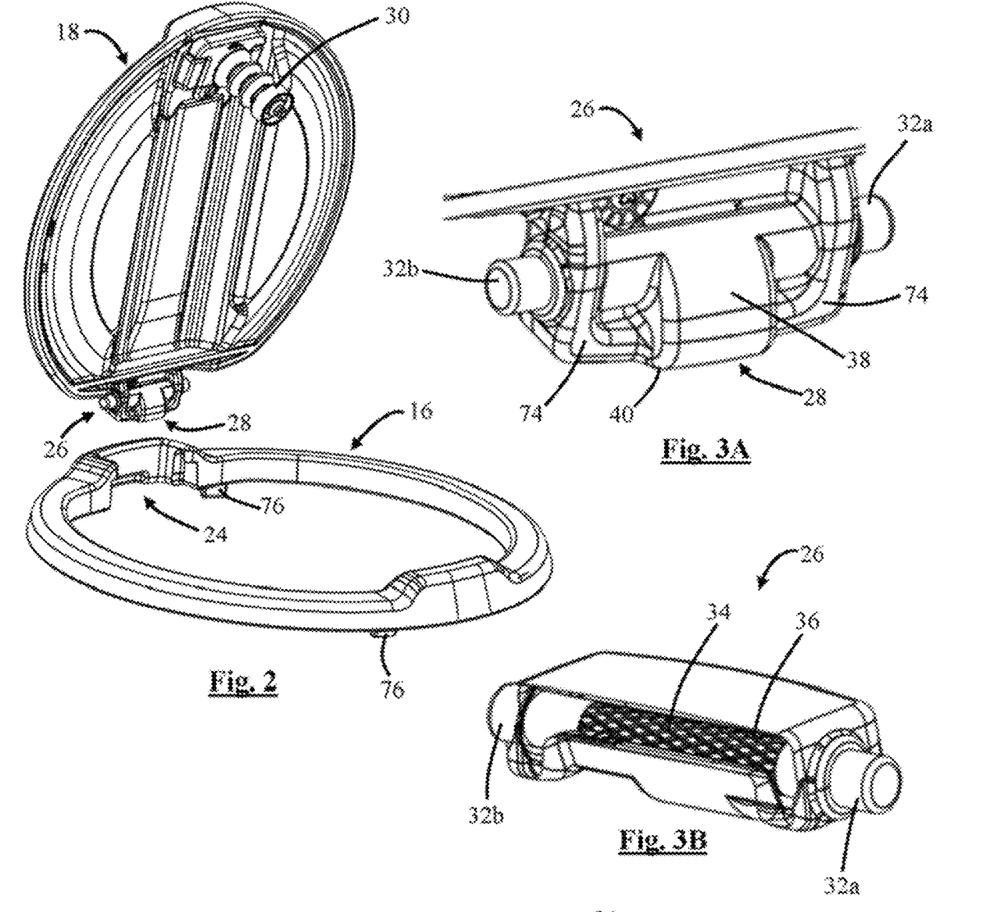
FIG. 2 is a partially exploded perspective view of a bezel and a door of the door assembly.
FIG. 3A is a close-up view of a portion of the door.
FIG. 3B is a close up and partial section view of a portion of the door.

FIG. 2 illustrates the bezel 16 and the door 18. The bezel 16 may be a generally circular or ring-shaped and includes a door coupling 24, shown in greater detail in FIGS. 4A and 4B. The door coupling 24 includes one or more features configured to coact with one or more features of the door 18 (i.e., like the bezel coupling 26) to connect together the bezel 16 and the door 18.

The door 18 may be a generally planar disc or plate that includes a bezel coupling 26, shown in greater detail in FIGS. 3A and 3B. The bezel coupling 26 includes one or more features configured to coact with one or more features of the bezel 16 (i.e., like the door coupling 24) to connect together the door 18 and the bezel 16 and/or to provide for the door 18 to move between the closed and open positions (FIGS. 1 and 2). The door 18 and/or the bezel coupling 26 includes a cam 28.

The door 18 includes a bumper 30 that is configured to contact or engage the bezel 16 or pocket 14 when the door 18 is in the closed position. The bumper 30 may be compressed between the door 18 and the bezel 16 or pocket 14 when the door is in the closed position. The bumper 30 may be uncompressed or unbiased when the door 18 is moved into an open position. The bumper 30 may assist with moving the door 18 into the open position, away from the bezel or 16 and pocket by urging or applying a force onto the door 18.

FIGS. 3A and 3B illustrate the bezel coupling 26. The bezel coupling 26 may include one or more axles. For example, the bezel coupling 26 includes axles 32a, 32b. The axles 32a, 32b may be the opposing end portions of a single axle shaft 34 (see FIG. 3B). The single axle shaft 34 may have a textured or knurled portion 36. Alternatively, the axles 32a, 32b may be separate, discrete pieces that extend from opposing ends of the bezel coupling 26.

The cam 28 is provided between the two axles 32a, 32b. The cam 28 may include one or more camming portions. For example, the cam 28 may include a first camming portion 38 and a second camming portion 40.

Figure 4A:
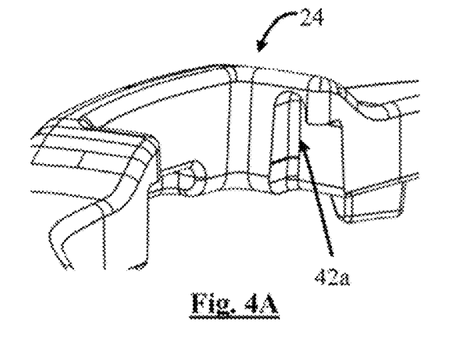
FIG. 4A is a close-up view of a portion of the bezel.
Figure 4B:
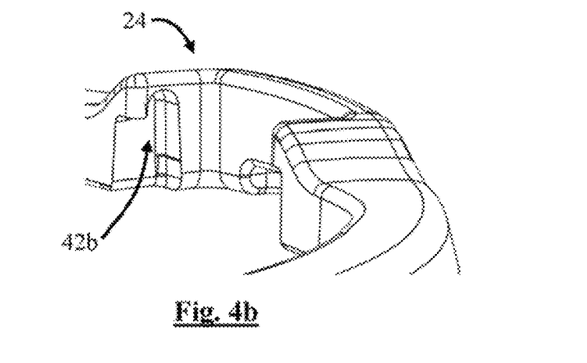
FIG. 4B is a close-up view of a portion of the bezel.

FIGS. 4A and 4B illustrate the door coupling 24. The door coupling 24 includes one or more features configured to coact with one or more features of the door 18 (i.e., like the bezel coupling 26) to connect together the bezel 16 and the door 18 and/or provide for the door 18 to move between the closed and open positions.

The door coupling 24 may include one or more axle slots. For example, the door coupling includes opposing axle slots 42a, 42b. The axle slots 42a, 42b are sized to receive and accommodate the respective axles 32a, 32b of the bezel coupling 26. The axle slots 42a, 42b are sized to allow the respective axles 32a, 32b to move or rotate within the slots 42a, 42b during movement of the door 18 between the closed and open positions (FIGS. 1A and 1B). The axle slots 42a, 42b have an inwardly facing open end (i.e., facing the cavity 44 of the pocket illustrated and described below at FIG. 5). The axle slots 42a, 42b are axially aligned along the door 18 axis of rotation A (See FIG. 8).

Figure 5:
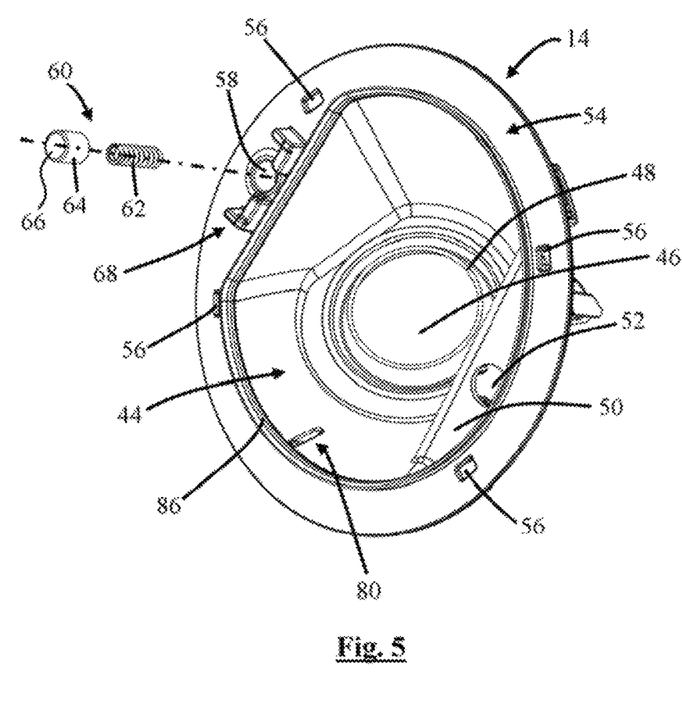
FIG. 5 is a partially exploded perspective view of a pocket.

Referring to FIG. 5, the pocket 14 includes a cavity 44. The cavity 44 may include one or more openings though which one or more components may extend or be accessed. For example, the cavity 44 includes opening 46, through which a component, such as a fuel fill pipe or a charging port may extend and/or be accessed (See component 22 at FIG. 1B). One or more seals or grommets 48 may surround the opening 46. The one or more seals or grommets may contact or engage the component to close out any gaps therebetween and/or to prevent noise or rattle between the component and the cavity during driving conditions. The pocket 14 and/or cavity 44 may include one or more ledges, like ledge 50 that may include one or more openings 52 for engaging bumper 30 (FIG. 2) when the door 18 is in the closed position.

The pocket 14 includes a flange 54. The flange 54 may at least partially surround the cavity 44. The flange 54 may extend generally horizontally from the cavity. The pocket 14 includes one or more bezel connection features 56 that are configured to coact with one or more mating pocket connection features 76 on the bezel 16 (See FIG. 2) to attach or connect together the pocket 14 and the bezel 16.

The pocket 14 may include one or more biasing bores, like biasing bore 58. The biasing bore 58 may be an aperture, pocket, or bore located or defined in the flange 54. The biasing bore 58 is configured to receive one or more biasing members, like biasing member 60. The biasing member 60 may be comprises of one or more members like a spring or other bias 62 and a cap 64. The biasing member 60, the cap 64, or both is biased via the bias 62 in a direction out of the biasing bore 58 and towards the axis of rotation A (See FIG. 8) of the door 18, towards the axle slots 42a, 42b, or both. The biasing member 60 is moveable into and out of the biasing bore 58 depending on whether the door 18 is in an open position or a closed position. The cap 64 includes a top or cam engaging surface 66 that is configured to contact or engage the cam 28 or one or more of the camming portions 38, 40 during movement of the door 18 between the closed and open positions and to urge the door towards the respective closed or open positions.

The pocket 14 may include one or more seals or gaskets, like seal or gasket 86. The seal or gasket 86 may be located on the flange 54 and may at least partially surround the cavity 44. The seal or gasket or another seal or gasket may be located on a backside of the flange 54 and contact or be compressed between the backside of the flange and the panel into which the door assemble is received and/or fixed. The seal or gasket 86 may form a seal with the bezel 16, the door 18, or both, to restrict or prevent ingress of fluid and/or debris from the surrounding environment into the pocket 14 when the door 18 or door assembly is in a closed position. The seal or gasket 86 may form a seal with the bezel 16, the door 18, or both, to restrict or prevent egress of fluid and/or debris from the pocket 14 to the surrounding environment when the door 18 or door assembly is in a closed position.

The pocket 14 may include one or more support members. With additional reference to FIG. 6, the pocket 14 includes a support member 68. The support member 68 includes one or more axle supports, like axle supports 70a, 70b. The axle supports 70a, 70b are configured to support or maintain the one or more of the axles 32a, 32b within the corresponding axle slots 42a, 42b. The axle supports 70a, 70b are configured to restrict or prevent the axles 32a, 32b from falling out of or being removed from the respective axle slots 42a, 42b.

Figure 6:
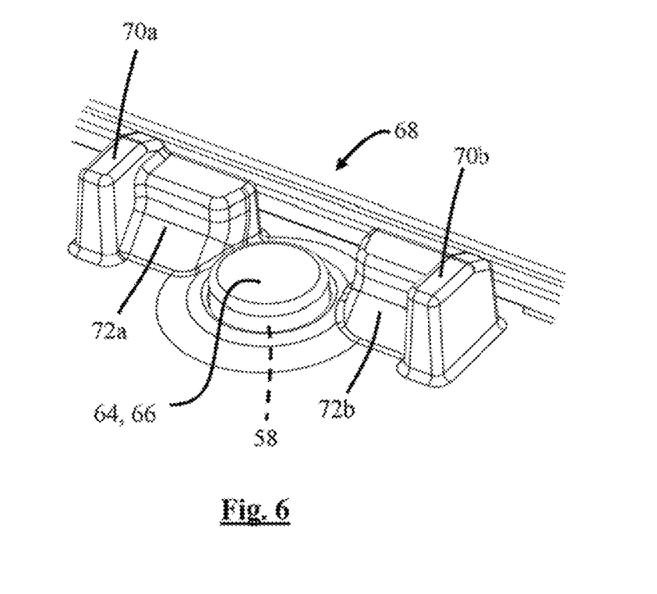
FIG. 6 is a close-up view of a portion of the pocket.

The support member 68 includes one or more door supports, like door supports 72a, 72b. The door supports 72a, 72b are configured to selectively contact the door 18 when the door 18 is moved into the open position to restrict or prevent the door 18 from opening beyond a predetermined open position. The door supports 72a, 72b may contact the door 18, the bezel coupling 26, and/or a region of the bezel coupling 26 identified in FIG. 3A at reference numeral 74 to prevent the door 18 to open beyond a predestined opening position.

Figure 7A:
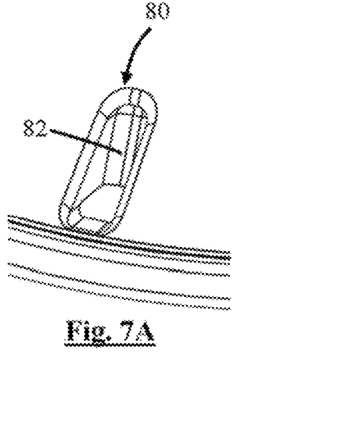
FIG. 7A is a close-up view of a portion of the pocket.
Figure 7B:
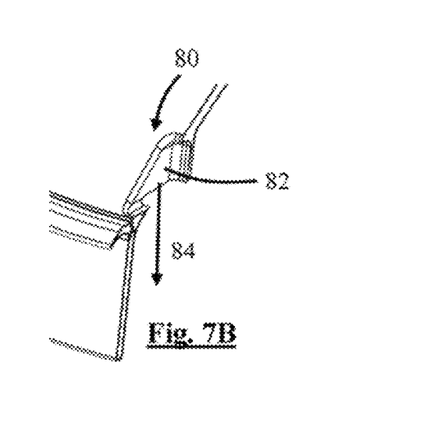
FIG. 7B is a section view of FIG. 7A.

FIGS. 7A and 7B illustrate the drain 80. The drain 80 may be configured to provide egress for fluids and/or debris to exit the pocket 14. The drain 80 may include a shroud 82 on a back side of the pocket 14 for directing the fluid and/or debris out of the pocket 14 in a generally vertical direction 84.

Figure 8:
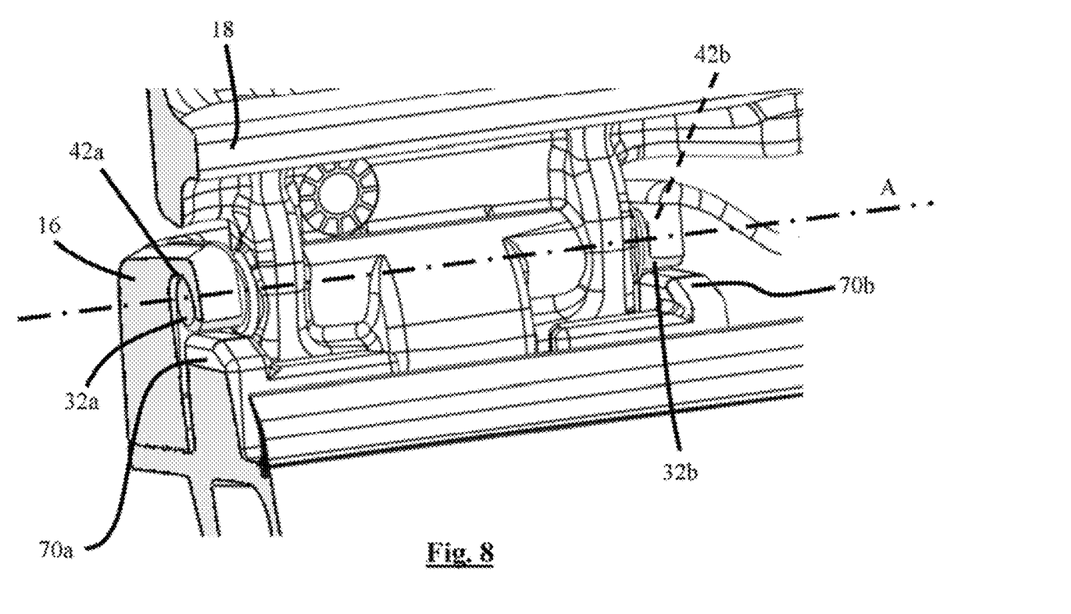
FIG. 8 is a partial section view of the door assembly.

FIG. 8 illustrates the door 18 or door assembly 10 in the open position. The axle supports 70a, 70b support the axles 32a, 32b from below to restrict or prevent the axles 32a, 32b from falling out of or being removed from the axle slots 42a, 42b. The axles 32a, 32b are journaled to the axle slots 42a, 42b. The door 18 is configured to rotate between the closed and open position about axis A, which is an axis that extends through the axles 32a, 32b and the axle slots 42a, 42b.

Figure 9:
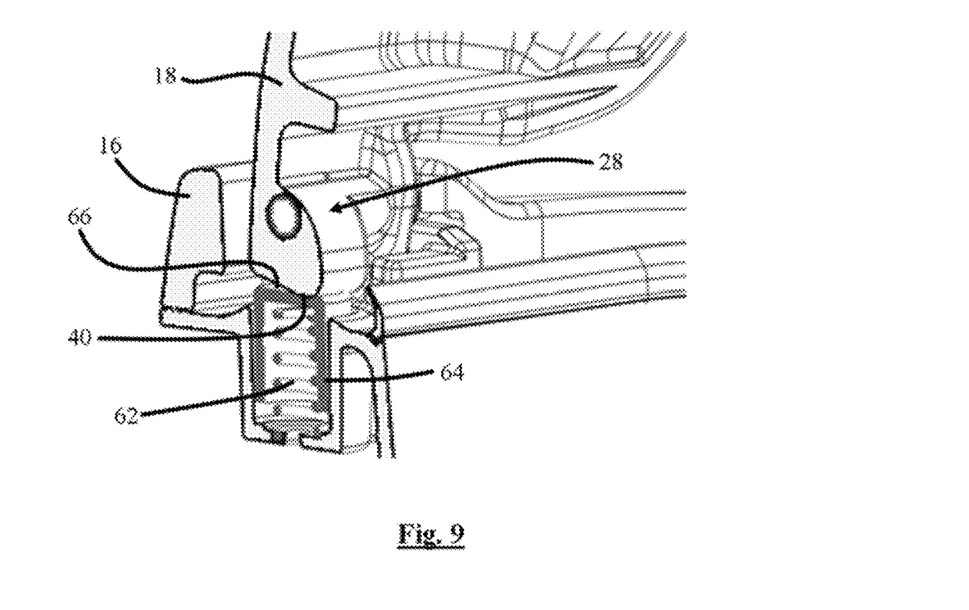
FIG. 9 is a partial section view of the door assembly.

FIG. 9 illustrates the door 18 or door assembly 10 in the open position. In the open position, the cam engaging surface 66 of the cap 64 is in contact with the second camming portion 40 of the cam 28. The bias 62 exerts an upwardly force onto the cap 64 to maintain contact with at least a portion of the second camming portion 40. The biasing member 62 urges the door 18 towards the open position when the cam engaging surface 66 at least partially contacts or engages the second camming portion 40. That is, when the door 18 is at or near the open position, the cam engaging surface 66 contacts and bears against the second camming portion 40 of the cam 28. Thus, when the door 18 is at or near the open position, the cam engaging surface 66 urges the door 18 toward the open position. The biasing member 62 also assists with urging the door 18 upwardly so that the axles 32a, 32b remain engaged or in contact with the axle slots 42a, 42b (See FIG. 8).

Figure 10:
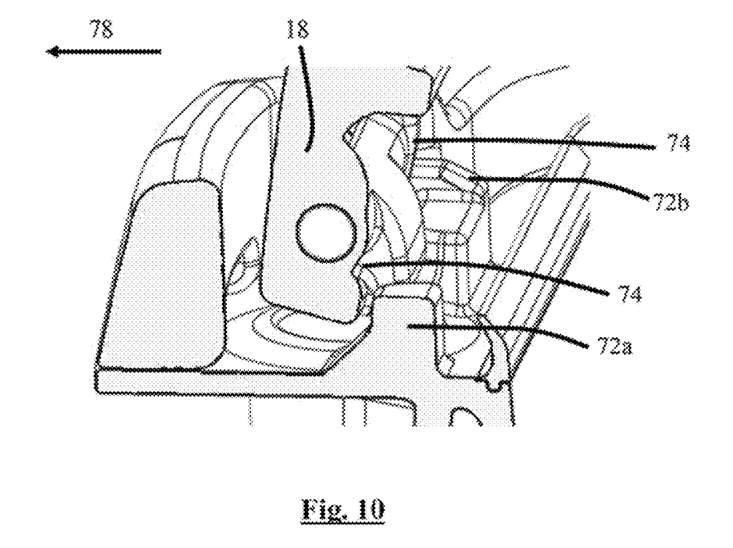
FIG. 10 is a partial section view of the door assembly.

FIG. 10 illustrates the door 18 or door assembly 10 in the open position. In the open position, the door supports 72a, 72b are adjacent to the stop features 74 of the bezel coupling 26. Any further movement of the door 18 in a further open position (direction 78) would result in the door supports 72a, 72b contacting the features 74 thus preventing any further movement of the door 18 in the direction 78 or past a predetermined maximum desired open position.

Figure 11:
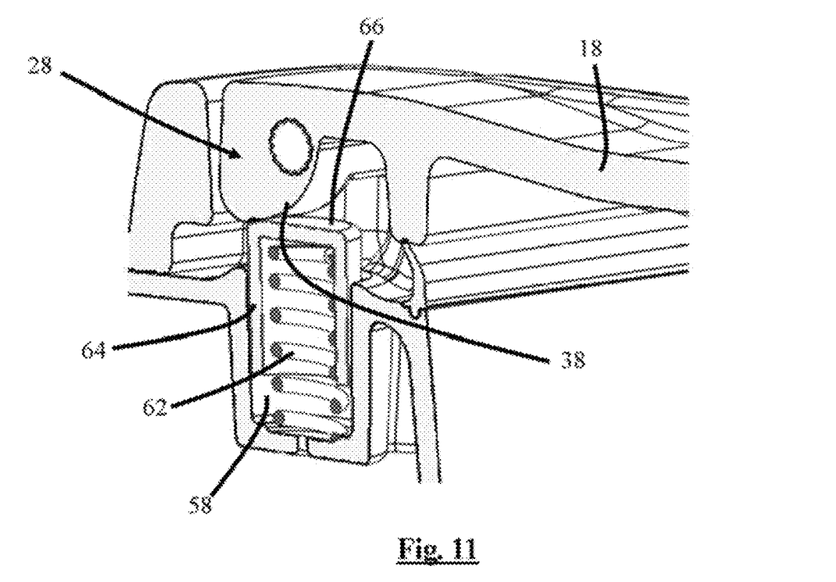
FIG. 11 is a partial section view of the door assembly.

FIG. 11 illustrates the door or door assembly 10 in the closed position. As the door 18 is moved from the open position to the closed position, the bias 62 exerts an upward force onto the cap 64, causing the cap 64 to move further out of the biasing bore 58 so that the cam engaging surface 66 of the cap 64 maintains contact with the cam 28 as the door 18 is moved. In the closed position, the cam engaging surface 66 of the cap 64 is in contact with the first camming portion 38. The biasing member 62 urges the door 18 towards the closed position when the cam engaging surface 66 at least partially contacts or engages the first camming portion 38. That is, the cam engaging surface 66 contacts and bears against the first camming portion 38 and forms an angle such that the cam engaging surface 66 is not flush with the first camming portion 38. Thus, when the door 18 is at or near the closed position, the cam engaging surface 66 urges the door 18 toward the closed position.

The biasing member 62 also assists with urging the door 18 upwardly so that the axles 32a, 32b remain engaged with or in contact with the axle slots 42a, 42b (See FIG. 8).

Figure 12:
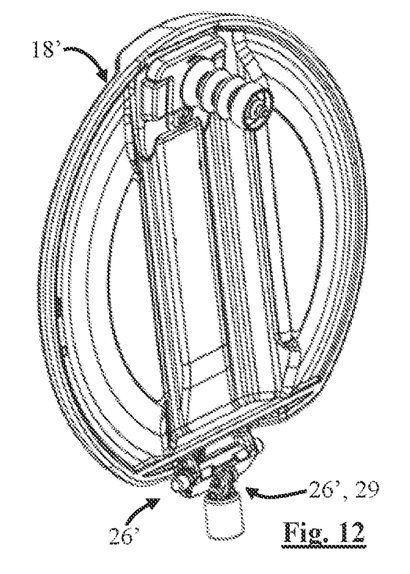
FIG. 12 is a perspective view of a door of the door assembly.

FIG. 12 illustrates a door 18'. The door 18' may include many of the same features of the door 18 illustrated in FIG. 2, thus, those features will not be introduced again in the interest of brevity. The door 18' includes a bezel coupling 26'. The bezel coupling 26' is configured to coact with the door coupling 24 of the bezel 16 illustrated in the previous figures to connect together the bezel 16 and the door 18' and/or to provide for the door 18' to move between the closed and open positions (FIGS. 1 and 2).

Figure 13:
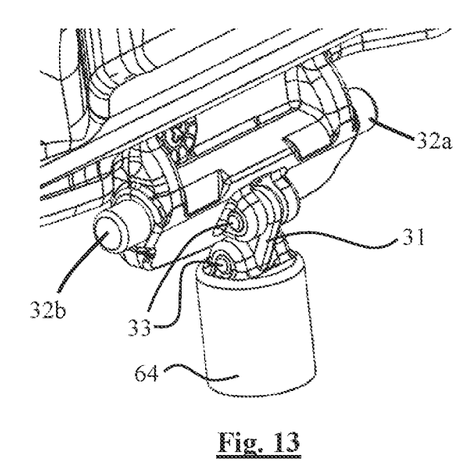
FIG. 13 is a close-up view of a portion of the door.
Figure 14:
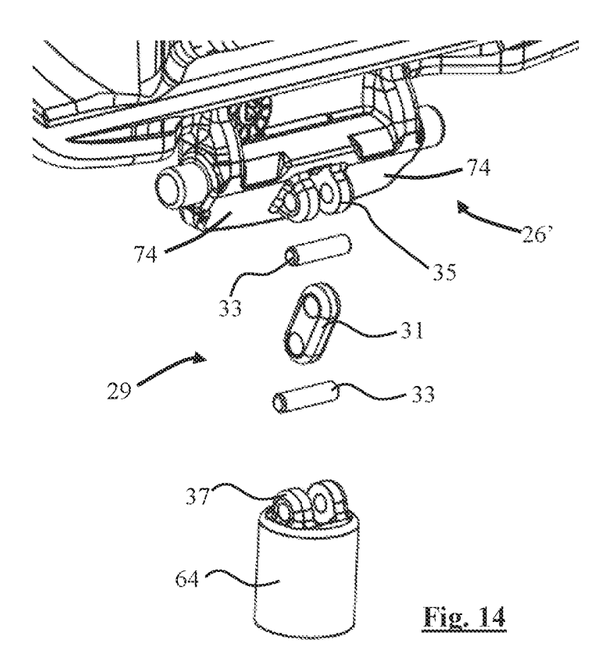
FIG. 14 is an exploded view of FIG. 13.

Referring now to FIGS. 12, 13, and 14, the bezel coupling 26' may include features and/or function similarly to the bezel coupling 26 in the previous figures. The bezel coupling '26 may include one or more axles. For example, the bezel coupling '26 includes axles 32a, 32b. The axles 32a, 32b may be the opposing end portions of a single axle shaft 34 (see FIG. 3B). The single axle shaft 34 may have a textured or knurled portion. Alternatively, the axles 32a, 32b may be separate, discrete pieces that extend from opposing ends of the bezel coupling '26. The bezel coupling 26' also includes the feature 74 illustrated and discussed above so that movement of the door beyond a predetermined max open position (See FIG. 10, direction 78) would result in the door supports 72a, 72b contacting the features 74 thus preventing any further movement of the door 18' in the direction 78 or past a predetermined maximum desired open position.

The bezel coupling 26' may include a link assembly 29. The link assembly 29 may function to connect together the door 18' and the biasing member 60 illustrated and described above. More specifically, the link assembly 29 may connect together the bezel coupling 26' and the cap 64. The link assembly 29 comprises a connecting link 31 that is secured to each of the bezel coupling 26' and the cap 64 via pins 33 that configured to engage corresponding supports 35, 37 on the bezel coupling 26' and the cap 64. Each of the supports 35, 37 may include one or more openings for each of the pins 33 to engage. The link 31 may also include one or more openings for each of the pins 33 to engage. The pins 33 may be secured to the supports 35, 37 such that the pins are enabled to rotate within the openings in the link 31 and supports 35, 37. Alternatively, one or more of the pins 33 may be restricted or prevented from rotating within the openings in the link 31 and/or supports 35, 37. One or more bearings may be provided at the pins 33 and/or openings to assist with the movement of the link assembly 29 during opening and closing of the door 18'.

Operation of the door assembly 10 with the door 18' in place of door 18 is substantially the same as described above. For example, as the door 18' is moved from the open position to the closed position, a bias (not shown, but the same as 62 in the previous figures) exerts an upward force onto the cap 64, causing the cap 64 to move further out of a biasing bore (not shown but can be same as biasing bore 58 in pocket 14) so that the link assembly 29 moves the door 18'. The pins 33 can rotate so the link 31 can move to allow the door 18' to move into an open position.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A door assembly comprising:
a pocket comprising a cavity and a flange having a planar surface extending horizontally from the cavity, the planar surface includes: one or more bezel connecting features and a biasing bore for accommodating a biasing member;
a ring-shaped bezel comprising one or more pocket connecting features that cooperate with the one or more bezel connecting feature to attach the bezel onto the planar surface of the flange, the bezel comprising at least one axle slot; and
a door comprising a cam and at least one axle,
wherein the at least one axle is received into the at least one axle slot, and the biasing member is enabled to apply an urging force onto the cam.

2. The door assembly according to claim 1, wherein the planar surface of the flange comprises at least one axle support extending in a direction of the at least one axle to support the at least one axle within the at least one axle slot.

3. The door assembly according to claim 1, wherein the pocket comprises one or more axle supports, located on the planar surface of the flange, the one or more axle supports configured to restrict or prevent the at least one axle from falling out of the at least one axle slot.

4. The door assembly according to claim 1, wherein the pocket comprises at least one door support extending from the flange, that coacts with the door to restrict movement of the door beyond a predetermined open position, the at least one door support is laterally offset from the biasing bore.

5. The door assembly according to claim 2, wherein the pocket comprises at least one door support extending from the flange, that coacts with the door to restrict movement of the door beyond a predetermined open position, the at least one door support is arranged on the flange between the biasing bore and the at least one axle support.

6. The door assembly according to claim 1, wherein the cavity comprises a wall structure that tapers from the flange to an opening through which a component of a vehicle is configured to extend.

7. The door assembly according to claim 1, wherein the flange comprises a seal extending from the flange in a direction of the door, and door contacts the seal when the door is moved into a closed position.

8. The door assembly according to claim 7, wherein a height of the seal extending from the flange is less than a height of at least one axle support extending from the flange.

9. The door assembly according to claim 1, wherein the pocket comprises a drain slot and a shroud on a backside thereof, the shroud at least partially surrounds the drain slot and directs egress of fluid and/or debris.

10. A door assembly comprising:
a pocket comprising a cavity and a flange extending horizontally from the cavity, the flange having at least one axle support and one or more bezel connecting features;
a bezel comprising one or more pocket connecting features that cooperate with the one or more bezel connecting feature to attach the bezel onto a top surface of the flange of the pocket, the bezel comprising at least one axle slot; and
a door comprising at least one axle,
wherein the at least one axle is received into the at least one axle slot and supported by the at least one axle slot from above, the at least one axle support supports the at least one axle within the at least one axle slot from below.

11. The door assembly according to claim 10, wherein the at least one axle is captured between the at least one axle slot and the at least one axle support.

12. The door assembly according to claim 11, wherein the pocket comprises at least one door support that coacts with the door to restrict movement of the door beyond a predetermined open position.

13. The door assembly according to claim 12, wherein the pocket comprises a biasing bore for accommodating a biasing member, the biasing member is enabled to apply an urging force onto a portion of the door, the at least one door support is arranged between the biasing bore and the at least one axle support.

14. The door assembly according to claim 13, wherein the biasing bore, the at least one door support, and the at least one axle support are arranged on the flange of the pocket.

15. The door assembly according to claim 14, wherein the pocket has a seal extending from the flange in a direction of the door, and a height of the seal extending from the flange is less than a height of the at least one door support extending from the flange and/or less than a height of the at least one axle support extending from the flange.

16. A door assembly comprising:
a door comprising at least one axle;
a pocket having a biasing bore for accommodating a biasing member having a cap and a biasing device, the pocket also including at least one axle support; and
a bezel attached to the pocket, the bezel comprising at least one axle slot;
wherein the at least one axle is received into the at least one axle slot and the at least one axle support is enabled to support the at least one axle within the at least one axle slot, and
wherein the door assembly comprises a link assembly comprising a link connecting together the door and the cap of the biasing member.

17. The door assembly according to claim 16, wherein the link is coupled to the door and to the cap of the biasing member via pins.

18. The door assembly according to claim 17, wherein the link is coupled to a support disposed on the cap.

19. The door assembly according to claim 17, wherein the door comprises two axles and a support for connecting to the link, the support is defined between the two axles.

20. The door assembly according to claim 17, wherein the pocket comprises at least one axle support extending in a direction of the at least one axle so that the at least one axle is captured between the at least one axle slot and the at least one axle support.

* * * * *